US007778830B2

(12) United States Patent
Davis et al.

(10) Patent No.: US 7,778,830 B2
(45) Date of Patent: Aug. 17, 2010

(54) TRAINING SPEAKER-DEPENDENT, PHRASE-BASED SPEECH GRAMMARS USING AN UNSUPERVISED AUTOMATED TECHNIQUE

(75) Inventors: Brent L. Davis, Deerfield Beach, FL (US); Peeyush Jaiswal, Boca Raton, FL (US); Fang Wang, Plano, TX (US)

(73) Assignees: International Business Machines Corporation, Burlington, MA (US); Nuance Communications, Inc., Burlington, MA (US)

( * ) Notice: Subject to any disclaimer, the term of this patent is extended or adjusted under 35 U.S.C. 154(b) by 1020 days.

(21) Appl. No.: 10/849,629

(22) Filed: May 19, 2004

(65) Prior Publication Data

US 2005/0261901 A1    Nov. 24, 2005

(51) Int. Cl.
*G10L 15/26* (2006.01)
(52) U.S. Cl. .......................... 704/235; 704/257; 704/9
(58) Field of Classification Search ................ 704/255, 704/257, 275, 270, 231, 246, 250, 243, 270.1, 704/235, 4, 7
See application file for complete search history.

(56) References Cited

U.S. PATENT DOCUMENTS

| | | | |
|---|---|---|---|
| 5,774,628 A | 6/1998 | Hemphill | |
| 5,937,385 A * | 8/1999 | Zadrozny et al. | 704/257 |
| 6,088,669 A | 7/2000 | Maes | |
| 6,119,087 A | 9/2000 | Kuhn et al. | |
| 6,167,377 A | 12/2000 | Gillick et al. | |
| 6,334,103 B1 * | 12/2001 | Surace et al. | 704/257 |
| 6,415,257 B1 * | 7/2002 | Junqua et al. | 704/275 |
| 6,434,524 B1 | 8/2002 | Weber | |
| 6,570,964 B1 | 5/2003 | Murveit et al. | |
| 6,604,075 B1 | 8/2003 | Brown et al. | |
| 6,985,862 B2 * | 1/2006 | Strom et al. | 704/255 |
| H2187 H * | 4/2007 | Yuchimiuk | 704/246 |
| 7,203,644 B2 * | 4/2007 | Anderson et al. | 704/243 |
| 7,263,489 B2 * | 8/2007 | Cohen et al. | 704/270 |
| 2003/0004717 A1 | 1/2003 | Strom et al. | |

OTHER PUBLICATIONS

Fussell, J.W. "Automatic sex identification from short segments of speech", Acoustics, Speech, and Signal Processing, 1991. ICASSP-91., 1991 International Conference on Apr. 14-17, 1991 pp. 409-412 vol. 1.*

* cited by examiner

*Primary Examiner*—Huyen X. Vo
(74) *Attorney, Agent, or Firm*—Wolf, Greenfield & Sacks, P.C.

(57) ABSTRACT

The present invention can include a method for tuning grammar option weights of a phrase-based, automatic speech recognition (ASR) grammar, where the grammar option weights affect which entries within the grammar are matched to spoken utterances. The tuning can occur in an unsupervised fashion, meaning no special training session or manual transcription of data from an ASR session is needed. The method can include the step of selecting a phrase-based grammar to use in a communication session with a user wherein different phrase-based grammars can be selected for different users. Feedback of ASR phrase processing operations can be recorded during the communication session. Each ASR phrase processing operation can match a spoken utterance against at least one entry within the selected phrase-based grammar. At least one of the grammar option weights can be automatically adjusted based upon the feedback to improve accuracy of the phrase-based grammar.

19 Claims, 3 Drawing Sheets

TRAINING SPEAKER-DEPENDENT, PHRASE-BASED SPEECH GRAMMARS USING AN UNSUPERVISED AUTOMATED TECHNIQUE

BACKGROUND

1. Field of the Invention

The present invention relates to the field of speech recognition and more particularly, to a technique for training speaker-dependent grammars.

2. Description of the Related Art

Speech-enabled automated response systems have been increasingly utilized for interfacing with customer support systems, software applications, embedded devices, and other such equipment. The vast majority of these systems attempt to convert received input into discrete textual words, thereafter performing programmatic actions based on discrete ones of these recognized words. The recognition systems typically lack a natural language understanding (NLU) and/or a phrase-oriented recognition capability, largely due to difficulties and/or expenses associated with implementing such capabilities.

One way to implement NLU and/or phrase-oriented recognition capabilities is through statistical modeling techniques that analyze probabilities of word sequences. That is, speech utterances are speech-to-text converted into a string of words, where the string of words can include alternatives for each word in the string. The words can then be processed by a grammar engine to determine the most likely meaning for the originally provided speech utterance. This approach can involve a plethora of computationally expensive operations and a vast quantity of processed data. Accordingly, statistically analyzing word strings via a grammar engine can be difficult to perform on resource restricted devices. Further, even when sufficient computational resources exist, adequate response time for real-time processing of speech input using statistical modeling techniques can be difficult to achieve and/or may compromise recognition accuracy.

Another approach to NLU and/or phrase-oriented recognition is to perform automatic speech recognition (ASR) on a phrase-by-phrase as opposed to a word-by-word basis. This approach can be extremely useful when the grammar of recognizable phrases is context-specific and each context is associated with a quantifiable and relatively small phrase set. As the phrase set grows, however, the recognition performance of this technique can geometrically degrade.

One means through which speech scientists improve recognition grammar performance when performing phrase-based speech conversions is through the addition of weights, which can be called grammar option weights. Grammar option weights can be applied to a recognition grammar to favor selected phrases and/or phrase groupings over others depending upon input phrases. When grammar option weights are intelligently assigned to related phrase sets, searches through large grammars of phrases can be conducted in a significantly more efficient manner, thereby resulting in more acceptable performance for larger grammars.

The assigning of weights to options of a phrase-based grammar, however, has proven to be a very difficult task, requiring subjective interpretations, experimentation, and qualitative determinations by speech experts. That is, assigning grammar option weights is largely a manual, time consuming, expert intensive process. Automation attempts to the weight assignment process have not yielded acceptable results.

More specifically, the attempts to date have been oriented towards training large speaker-independent grammars using vast sets of training data. Even should such attempts succeed, the approach is inherently flawed. Optimizing a phrase recognition engine for phrases uttered by a particular person or set of people will de-optimize the same engine for phrases uttered by a different population. This is natural, as different populations speak in different fashions. Accordingly, low accuracy can inevitably result from a conventional approach, at least when used by a population of vocally diverse users.

Further, such an approach can require a vast training store be used to establish grammar option weights. The gathering and processing of large data sets can be expensive in terms of time and computing resources. Further, a grammar automatically tuned using a vast training store will remain fixed until another tuning stage occurs, which can represent a large period, thereby resulting in slowly implemented and drastic adjustments. Further, there is no guarantee that a new tuning stage will result in better performance than a previous stage, as tuning is broadly and indiscriminately applied to the grammar.

SUMMARY OF THE INVENTION

The present invention includes a method, a system, and an apparatus for training a recognition grammar in accordance with an embodiment of the inventive arrangements disclosed herein. More specifically, a multitude of different recognition grammars can be established, where each recognition grammar can be constructed for a particular user and/or population of users having similar vocal characteristics. These recognition grammars can be generically referred to herein as speaker-dependent grammars. For each recognition session in which a speaker-dependant grammar is utilized, feedback relating to the session can be recorded. This feedback can be utilized to automatically adjust the weights associated with the recognition grammar used during the session. In a particular embodiment, the weight adjustments can occur in an unsupervised fashion, meaning no special training session or transcription process is needed.

In one arrangement, the present invention can be used to tune speaker-dependent grammars in an unsupervised fashion, thereby not requiring the time and attention of speech recognition experts, which can be very expensive. In another arrangement, the tuning of recognition grammars can occur on a session-by-session basis based upon feedback typically available within recognition sessions. Accordingly, the accuracy of grammars can be rapidly improved in an inexpensive manner without degrading operational performance of a speech recognition system.

In still another arrangement, the present invention can provide continuous improvements to grammars, where the more a given grammar is utilized by an associated population, the better the accuracy for that grammar will be. In contrast, diverse usages of speaker-independent grammars by vocally diverse populations tends to result in accuracy strongly biased towards a subset of users. Worse, usages by users outside this biased subset, can degrade the performance of the grammar when used by the predominate user popular. The present invention does not suffer from the biases inherent in conventional speech recognition techniques since each grammar is speaker-dependent.

One aspect of the present invention can include a method for tuning grammar option weights of a phrase-based, automatic speech recognition (ASR) grammar, where each grammar option weight is associated with a particular entry in the grammar. Grammar option weights can affect which phrases within the grammar are matched to spoken utterances by establishing a preference for certain grammar entries over other entries. For example, entries associated with a greater grammar option weight can be preferred for matching purposes over entries associated with a lesser grammar option weight.

The method can include the step of selecting a phrase-based grammar to use in a communication session with a user, wherein different phrase-based grammars can be selected for different users. Feedback of ASR phrase processing operations can be recorded during the communication session. Each processing operation can match a spoken utterance against at least one phrase within the selected phrase-based grammar. At least one of the grammar option weights can be automatically adjusted based upon feedback to improve accuracy of the selected phrase-based grammar.

Another aspect of the present invention can include a machine-readable storage having stored thereon, an ASR computer program having a plurality of code sections. The code sections can be executable by a machine for causing the machine to tune speaker-dependent grammars. Specifically, one of a multitude of speaker-dependent grammars can be selected for a communication session. Feedback can be recorded during this communication session. After the communication session, the recorded feedback can be utilized to adjust the selected speaker-dependent grammar to improve recognition accuracy of the ASR computer program.

Still another aspect of the present invention can include a phrase-based ASR system including an identification unit, an information collection unit, and/or a logic unit. The identification unit can match a speaker to a speaker-dependent ASR grammar. The information collection unit can gather feedback in real-time concerning whether a plurality of phrases has been correctly processed by the ASR grammar during an ASR session involving the speaker. The logic unit can utilize the feedback to tune the ASR grammar. That is, when a phrase in the ASR session has been correctly processed, at least one parameter in the ASR grammar can be adjusted to increase a likelihood that the ASR system processes phrases in a similar fashion in the future. When a phrase in the ASR session has been incorrectly processed, at least one parameter in the ASR grammar can be adjusted to decrease a likelihood that the ASR system processes phrases in a similar fashion in the future.

It should be noted that the invention can be implemented as a program for controlling a computer to implement the functions described herein, or a program for enabling a computer to perform the process corresponding to the steps disclosed herein. This program may be provided by storing the program in a magnetic disk, an optical disk, a semiconductor memory, any other recording medium, or distributed via a network.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
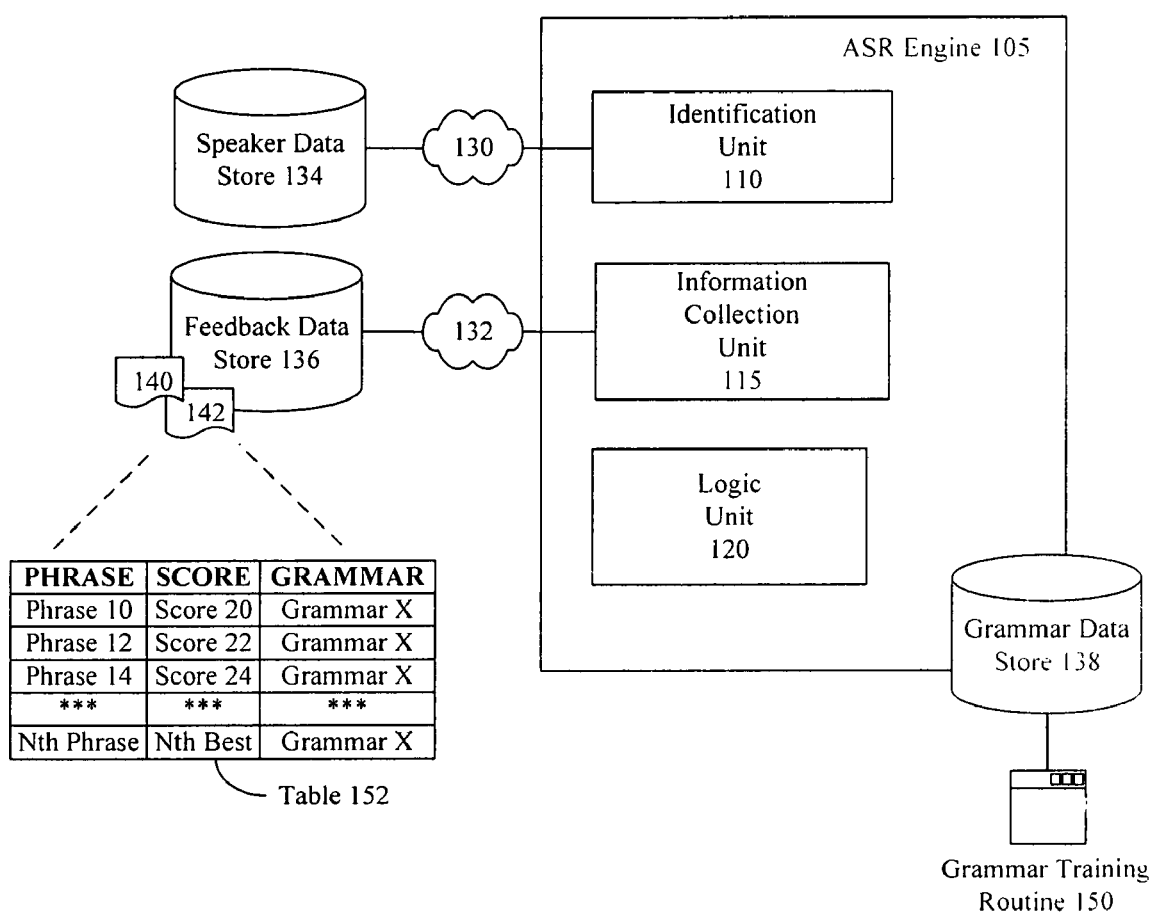
FIG. 1 is a schematic diagram illustrating a system for performing speech recognition using a multitude of speaker dependent grammars having automatic training features in accordance with an embodiment of the inventive arrangements disclosed herein.

FIG. 1 is a schematic diagram illustrating a system 100 for performing speech recognition using a multitude of speaker dependent grammars having automatic training features in accordance with an embodiment of the inventive arrangements disclosed herein. The system 100 can include an automatic speech recognition engine 105 communicatively linked to a grammar data store 138.

The automatic speech recognition (ASR) engine 105 can interpret speech utterances to trigger one or more programmatic actions within a speech-enabled software application. The ASR engine 105 can be a standalone software application, can be a component of a speech-enabled application, can be a Web service, can be firmware embedded within a speech-enabled device, and the like. The ASR engine 105 can be centrally located and/or can be distributed throughout multiple locations of a network.

The ASR engine 105 can include at least one speaker-dependent mode. The speaker-dependent mode can utilize the identification unit 110 to associate a speaker with an ASR grammar within the grammar data store 138. Each grammar in the grammar data store 138 can include a multitude of phrases that can be matched against speech utterances. For this reason, grammars in-the grammar data store 138 can be considered phrase-based grammars. Additionally, each grammar can include a number of grammar option weights.

A grammar option weight can be a value associated with a grammar entry. Grammar option weights can cause some entries within a grammar to be more likely matched to utterances than other entries. In other words, the grammar option weights can be used to focus searches against the grammar data store 138. The grammar option weights can affect which phrases within a grammar are matched to spoken phrases and/or utterances as well as affect the time needed to match phrases with spoken utterances.

In one embodiment, the speaker dependent grammars and the grammar option weights can be context dependent. That is, different grammar option weights can be assigned to a single entry in the grammar, where the each such grammar option weight corresponds to a speech processing context. For example, a menu and/or branch of a speech-enabled IVR system can determine the context for ASR processing purposes. Since different contexts can have different associated grammar option weights, different matches for the same utterance can occur depending upon the context for which the ASR processing has been triggered.

In another embodiment, the identification unit 110 can select a user-dependent grammar for ASR operations that is utilized exclusively for ASR processing operations involving the current user. In such an embodiment, the identification unit 110 can initialize a login process through which the user is identified. If a login process has been previously performed, the identification unit 110 can utilize pre-existing user information to identify a user. A database, a look-up table, and the like can be used to correlate the user's identity with a suitable grammar.

In still another embodiment, the identification unit 110 can identify vocal characteristics for the user. Vocal characteristics can include such characteristics as pitch, accent, timber, phrasing, idiom, and/or the like. Moreover, the vocal characteristics can be stored within a speaker data store 134, which can be a storage area remote from the ASR engine 105 accessible via network 130. For example, a voice browser utilizing the ASR engine 105 can record voice characteristics for users in the speaker data store 134. In another example, a computer accessing a remotely located ASR engine 105 can include the speaker data store 134, which can be a local repository where voice characteristics for the computer's user(s) are stored.

The ASR engine 105 can also include an information collection unit 115 configured to gather feedback from ASR communication sessions. In one embodiment, the feedback can indicate whether each of a multitude of ASR processed phrases has been correctly processed by the ASR engine 105. In one embodiment, the ASR engine 105 can prompt a speaker to confirm whether each phrase has been correctly processed, where the response to the prompting is stored by the information collection unit 115. In another embodiment, ASR processed phrases can be considered to be correctly processed unless a user specifies that a misrecognition event has occurred. In such an embodiment, feedback can be recorded only for those ASR phrases that have been misrecognized so that phrases without associated indications are assumed to be correctly processed.

Feedback collected by the information collection unit 115 can be stored in a feedback data store 136. In one embodiment, the feedback data store 136 can be local to the ASR engine 105. In another embodiment, the feedback data store 136 can be remotely located and accessed via a network 132.

Feedback in the feedback data store 136 can include phrase processing results 140 and phrase processing details 142. The results 140 indicate whether an associated phrase was processed correctly or not. The details 142 can include an n-best list that the ASR engine 105 generated when processing a phrase. The n-best list can include the top n choices for hypothesized words as well as a quantified score associated with each choice:

For example, the n-best list can include a table 152 having columns like phrase, score, and/or grammar. The rows in table 152 can indicate a multitude of different phrases within the n-best list, like phrase 10, phrase 12, phrase 14, and the like. Each phrase entry can have an associated likelihood score, such as score 20, score 22, score 24, and the like. Each likelihood score can indicates the likelihood that the associated phrase is an accurate match for a processed utterance. Moreover, a grammar from which the match occurred can be specified for each entry of the table 152. A column for grammar can be particularly important to maintain data referential integrity in arrangements where databases are used to store the results 140 and/or the details 142.

The ASR engine 105 can utilize a logic unit 120 to tune grammars in the grammar data store 138 based upon the feedback gathered by the information collection unit 115. In one embodiment, the logic unit 120 can tune a grammar at the close of a communication session. For example, all sessions involving a grammar associated with a single user can be processed soon after the end of a session with the user. In another embodiment, the logic unit 120 can process feedback from multiple sessions in batch to tune grammars. For example, all sessions involving a grammar associated with set of voice characteristics can be processed on a nightly basis. In yet another embodiment, the logic unit 120 can process feedback during a communication sessions. For example, when a user of a context dependent communication session leaves a particular context, grammar option weights for that context can be adjusted.

Each phrase within a session can be processed in turn by the logic unit 120. In one embodiment, statistical sampling techniques can be used to tune grammars based on a portion of the processed phrases of each session. Further, similar phrases processed by the ASR engine 105 can be pre-processed as one or more groups, where training and/or tuning a grammar can be based upon these groupings as well as upon individual phrase results and corresponding feedback.

When the logic unit 120 determines that a phrase has been processed correctly, at least one parameter in an associated ASR grammar can be adjusted to increase a likelihood that the ASR engine 105 will processes similar phrases in a similar fashion in the future. In contrast, when the logic unit 120 determines that a phrase has been incorrectly processed, the logic unit 120 can adjust at least one parameter in an associated ASR grammar to decrease the likelihood that the ASR engine 105 will process similar phrases in a similar fashion in the future.

In a particular embodiment, the logic unit 120 can update grammar option weights for grammars in the grammar data store 138 directly. In another embodiment, the logic unit 120 can convey processed adjustments 144 to one or more grammar training routines 150.

It should be noted that the system 100 can train grammars in accordance with an embodiment of the inventive arrangements disclosed herein in an unsupervised fashion. That is, the training of grammars can occur automatically responsive to live interactions with the ASR engine 105. Accordingly, no special training sessions are necessary to train grammars. Further, grammars can be trained without manual intervention, fabricated training data, and/or other training data received via external sources.

It should be appreciated that the arrangements shown in FIG. 1 are for illustrative purposes only and that the invention is not limited in this regard. The functionality attributable to the various components can be combined or separated in a different manner than those illustrated herein. For instance, the identification unit 110 and the information collection unit 115 can be implemented as a single software component in another arrangement of the present invention.

It should be noted that data stores 134, 136, and 138 can store information in any recording medium, such as a magnetic disk, an optical disk, a semiconductor memory, and the like. Further, each of the data stores 134, 136, and 138 can utilize any information retention technique including a file-based storage technique or a database storage technique. Moreover, each of the data stores 134, 136, and 138 can be a storage area fixed to a geographical location or a storage area distributed across a network space. Additionally, table 152 is for illustrative purposes only and other contemplated embodiments of the presented invention need not contain the rows and/or columns shown.

Figure 2:
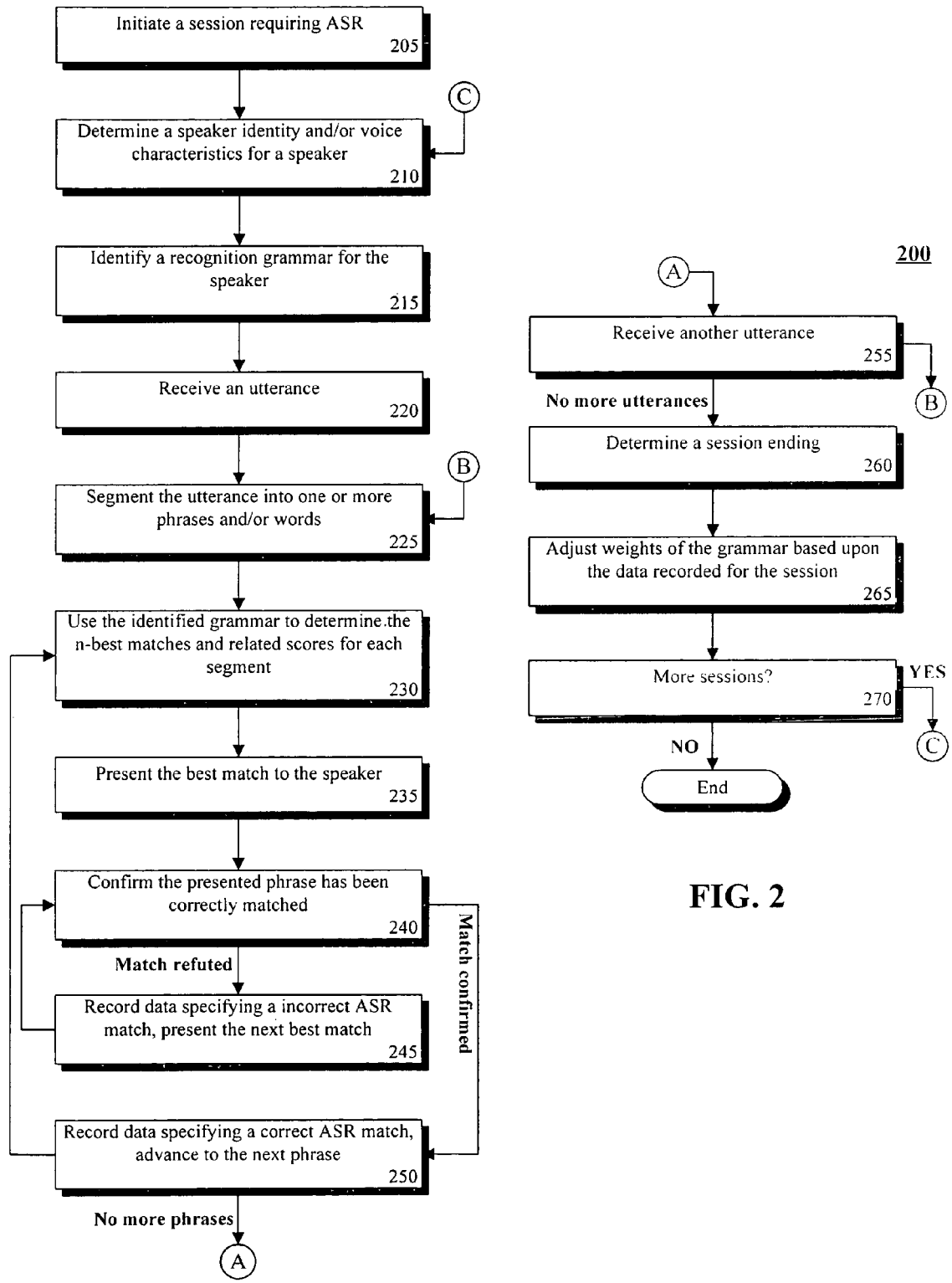
FIG. 2 is a flow chart illustrating a method for tuning speaker-dependant speech recognition grammars in accordance with an embodiment of the inventive arrangements disclosed herein.

FIG. 2 is a flow chart illustrating a method 200 for tuning speaker-dependant speech recognition grammars in accordance with an embodiment of the inventive arrangements disclosed herein. In one embodiment the method 200 can be performed in the context of the system 100 of FIG. 1. The method 200, however, is not limited in this regard and can be utilized in the context of any ASR system with speaker-dependant grammars.

The method 200 can begin in step 205, where a communication session can be initiated. The session can be, but is not limited to, a speech-enabled interactive voice response (IVR) session, a dictation session, a session with a speech-enabled integrated device, a speech-enabled computing application session, and the like. In step 210, a speaker identity can be determined that is associated with a speaker-dependant recognition grammar. For example, the session can request a user identifier and/or user login. Alternatively, voice characteristics for the speaker can be determined. In a particular embodiment, the voice characteristics can be based upon data recorded from previous ASR sessions.

In step 215, a speech recognition grammar can be selected for the speaker based upon the speaker identity and/or voice characteristics of the speaker, which were determined in step 210. In step 220, the speaker can provide an utterance, which is to be automatically converted, to text. In step 225, the utterance can be separated into one or more phrases, where each phase can be separately processed by an ASR engine. In step 230, the ASR engine can use the identified grammar to convert the phrase to text and/or to trigger a programmatic action responsive to the uttered phrase. The ASR engine can determine the n-best matches and corresponding match likelihood scores for each of the n-best matches. In step 235, the best match from the list can be presented to the speaker so that the speaker can confirm the accuracy of the ASR results.

In step 240, the speaker can confirm and/or refute the accuracy of the ASR results. If the speaker refutes that accuracy of the ASR results, the method can proceed to step 245. In step 245, data specifying an incorrect ASR match can be recorded within a feedback data store established for the session. The next best match from the n-best match list can then be presented. The method can loop to step 240, where the speaker can confirm the accuracy of the presented ASR match.

If the speaker confirms the accuracy of the ASR match of step 240, the method can proceed to step 250. In step 250, data specifying a correct ASR mach can be recorded within the feedback data store. If more phrases are to be ASR converted for the utterance received in step 220, the method can loop to step 230, where the next phrase of the utterance can be processed. If no more phrases are to be processed, the method can proceed to step 255, where another utterance can be received.

When another utterance is received, the method can progress from step 255 to step 225, where the received utterances can be segmented into one or more phrases for processing by the ASR engine. When no new utterances are received, the method can continue to step 260. In step 260, the interactive ASR communication session can end. In step 265, weights for the grammar used within the ASR session can be adjusted based upon the feedback data. In step 270, a determination can be made whether more ASR sessions are to be conducted. When there are more sessions, the method can loop to step 210 where a speaker identity for the session can be determined so that a suitable ASR grammar can be selected. When there are no more sessions to process, the method can terminate.

Figure 3:
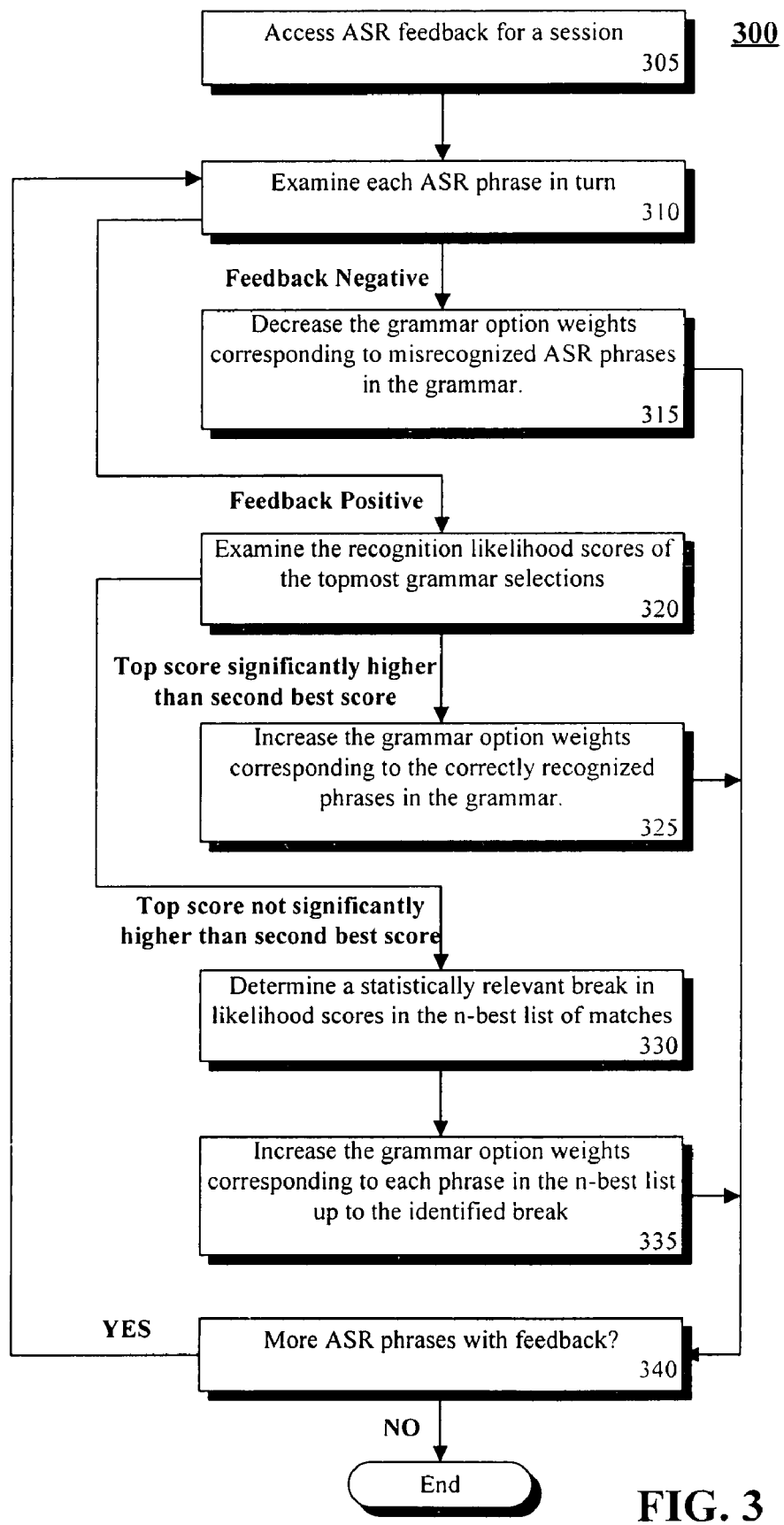
FIG. 3 is a flowchart illustrating a method for adjusting weights in a grammar based upon feedback in accordance with an embodiment of the inventive arrangements disclosed herein.

FIG. 3 is a flowchart illustrating a method 300 for adjusting weights in a grammar based upon feedback in accordance with an embodiment of the inventive arrangements disclosed herein. In one embodiment, the method 300 can be performed in the context of step 265 of FIG. 2. The method 300, however, is not limited in this regard and can be utilized in the context of tuning any ASR system with speaker-dependant grammars.

The method 300 can begin in step 305, where the ASR feedback can be accessed for an identifiable session. In step 310, each ASR processed phrase can be examined in turn. When the feedback for the phrase is negative, the method can proceed to step 315. In step 315, a grammar option weight corresponding to the misrecognized phrase can be decreased, thereby making the selection of the corresponding phrase less likely in a scenario similar to the associated misrecognition scenario. The method can proceed from step 315 to step 340.

When the feedback for the phrase is positive, the method can proceed from step 310 to step 320. In step 320, the recognition likelihood scores of the topmost grammar selections within an n-best list associated with an ASR match can be examined. When the topmost score is significantly higher than the second best score in the list, the method can progress to step 325. In step 325, the grammar option weights corresponding to the correctly recognized phrase can be increased. This increase can assure that further ASR matches for uttered phrases similar to the evaluated one are likely to be similarly matched by the ASR engine in the future. The method can progress from step 325 to step 340.

When the top score of the n-best list is not significantly higher than the second best score, the method can proceed from step 320 to step 330. In step 330, a statistically relevant break in between match scores in the n-best list can be determined. For example, in one embodiment, a statistically relevant break can be determined whenever two sequentially ordered scores differ by a value over ten percent.

In step 335, the grammar option weights associated with each phrase up to the identified break can be increased. The method can then progress to step 340, where a check for additional ASR phrases can occur. If in step 340, more phrases exist, the method can loop to step 310, where the next phrase can be processed. If there are no more phrases in step 340, the method can finish. Appreciably, feedback relating to other sessions can processed by method 300, causing grammars associated with these other sessions to be trained.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method for performing speech recognition, the method comprising:
   operating at least one processor programmed to perform:
      initiating a communication session with a speaker, the communication session requiring automatic speech recognition (ASR);
      determining a characteristic of the speaker, the characteristic selected from a group consisting of a speaker identity and at least one voice characteristic for the speaker;
      identifying a speaker-dependent, phrase-based grammar to use in the communication session with the speaker, wherein different speaker-dependent, phrase-based grammars are used for different users based on at least one speaker-dependent feature independent of a gender of the users;

recording feedback of ASR phrase processing operations during the communication session, wherein each ASR phrase processing operation seeks to match a spoken utterance against at least one entry within the identified speaker-dependent, phrase-based grammar, each entry of the at least one entry within said identified speaker-dependent, phrase-based grammar having a plurality of grammar option weights, each of the plurality of grammar option weights corresponding to a respective speech processing context, wherein the grammar option weights affect which entries are matched to the spoken utterances;

automatically adjusting the grammar option weights based upon recorded feedback data for the communication session to improve accuracy of the identified speaker-dependent, phrase-based grammar.

2. The method of claim 1, wherein the at least one processor is programmed to perform:

selecting one of a plurality of grammars as the grammar based upon an identity of a user that provides the utterances, wherein the selected grammar is utilized exclusively for ASR processing operations involving the user.

3. The method of claim 2, wherein each of said adjusting steps occurs proximate in time and occurs responsive to the ending of the communication session.

4. The method of claim 1, wherein the at least one processor is programmed to perform:

identifying vocal characteristics for a user that provides the utterances; and selecting one of a plurality of grammars as the grammar based upon the vocal characteristics, wherein the selected grammar is utilized by a plurality of different users, each user having the identified vocal characteristics.

5. The method of claim 4, wherein said method is performed periodically in batch, where a batch adjusts grammar option weights for the grammar using feedback recorded during a plurality of communication sessions.

6. The method of claim 1, said adjusting step further comprising:

when feedback for the ASR phrase processing operation is positive, adjusting the grammar option weight to increase a likelihood of matching entries in the grammar that are associated with the grammar option weight; and when feedback for the ASR phrase processing operation is negative, adjusting the grammar option weight to decrease a likelihood of matching entries in the grammar that are associated with the grammar option weight.

7. The method of claim 6, wherein the feedback for at least one ASR phrase processing operation includes at least a portion of an n-best list of phrases, wherein said adjusting step adjusts a plurality of grammar option weights.

8. The method of claim 7, wherein each entry in the n-best list is associated with a score, said method further comprising the steps of:

statistically analyzing the scores associated with ordered entries in the n-best list to determine a break point between entries; and for each entry up to the break point, adjusting a grammar option weight associated with the entry.

9. A machine-readable recording medium having stored thereon, a computer program having a plurality of code sections, said code sections being executable by a machine for causing the machine to perform the steps of:

initiating a communication session with a speaker, the communication session requiring automatic speech recognition (ASR);

determining a characteristic of the speaker, the characteristic selected from a group consisting of a speaker identity and at least one voice characteristic for the speaker;

identifying a speaker-dependent, phrase-based grammar to use in the communication session with the speaker, wherein different speaker-dependent, phrase-based grammars are used for different users based on at least one speaker-dependent feature independent of a gender of the users;

recording feedback of ASR phrase processing operations during the communication session, wherein each ASR phrase processing operation seeks to match a spoken utterance against at least one entry within the identified speaker-dependent, phrase-based grammar, each entry of the at least one entry within said identified speaker-dependent, phrase-based grammar having a plurality of grammar option weights, each of the plurality of grammar option weights corresponding to a respective speech processing context, wherein the grammar option weights affect which entries are matched to the spoken utterances; and automatically adjusting the grammar option weights based upon the recorded feedback data for the communication session to improve accuracy of the identified speaker-dependent, phrase-based grammar.

10. The machine-readable recording medium of claim 9, wherein the feedback includes at least part of an n-best list of ASR matched entries associated with individual utterances processed during the communication session, each ASR matched entry having an associated likelihood score.

11. The machine-readable recording medium of claim 10, further causing the machine to perform the steps of:

identifying when one of the individual utterances has been incorrectly matched based upon the feedback; and responsive to said identifying step, adjusting at least one parameter within the identified phrase-based grammar so that the likelihood score associated with the topmost entry in the n-best list is decreased when the ASR computer program next processes an utterance similar to the incorrectly identified utterance in a session involving the identified phrase-based grammar.

12. The machine-readable recording medium of claim 11, further causing the machine to perform the steps of:

determining at least one entry in the n-best list having a likelihood score that is statistically close to the likelihood score associated with the topmost entry; and responsive to said determining step, adjusting at least one parameter within the identified phrase-based grammar so that each likelihood score associated with each entry determined to be statistically close to the topmost entry is decreased when the ASR computer program next processes an utterance similar to the incorrectly identified utterance in a session involving the identified phrase-based grammar.

13. The machine-readable recording medium of claim 10, further causing the machine to perform the steps of:

identifying when one of the individual utterances has been correctly matched based upon the feedback; and responsive to said identifying step, adjusting a parameter within the identified phrase-based grammar so that the likelihood score associated with the topmost entry in the n-best list is increased when the ASR computer program next processes an utterance similar to the correctly identified phrase in a session involving the identified phrase-based grammar.

14. The machine-readable recording medium of claim 13, further causing the machine to perform the steps of:
   determining at least one entry in the n-best list having a likelihood score that is statistically close to the likelihood score associated with the topmost entry; and
   responsive to said determining step, adjusting at least one parameter within the identified phrase-based grammar so that each likelihood score associated with each entry determined to be statistically close to the topmost entry is increased when the ASR computer program next processes an utterance similar to the correctly identified utterance in a session involving the identified phrase-based grammar.

15. A computer-implemented system for performing speech recognition, the system comprising:
   at least one computer programmed to:
      initiate a communication session with a speaker, the communication session requiring automatic speech recognition (ASR); and
      determine a characteristic of the speaker, the characteristic selected from a group consisting of a speaker identity and at least one voice characteristic for the speaker; and
   an identification unit configured to identify a speaker-dependent phrase-based ASR grammar to use in the communication session, wherein different phrase-based grammars are used for different users based on at least one speaker-dependent feature independent of a gender of the users;
   an information collection unit configured to record feedback in real-time of ASR phrase processing operations during the communication session, wherein each ASR phrase processing operation seeks to match a spoken utterance against at least one entry within the identified speaker dependent, phrase-based grammar, each entry of the at least one entry within said identified speaker dependent, phrase-based grammar having a plurality of grammar option weights, each of the plurality of grammar option weights corresponding to a respective speech processing context, wherein the grammar option weights affect which entries are matched to the spoken utterances; and
   a logic unit configured to utilize said recorded feedback to automatically adjust the grammar option weights of the ASR grammar to improve accuracy of the identified speaker dependent, phrase-based grammar.

16. The system of claim 15, wherein the feedback gathered by the information collection unit for each ASR processed phrase comprises:
   a plurality of possible matching entries determined by the ASR system; and
   for each possible matching entry, a likelihood score that indicates the likelihood of the associated possible matching phrase being an accurate textual representation of an utterance.

17. The system of claim 15, wherein the logic unit adjusts the ASR grammar to affect a plurality of possible matching entries responsive to a single ASR processed utterance.

18. The system of claim 15, wherein when an utterance has been correctly processed, at least one parameter in the ASR grammar is adjusted to increase a likelihood that the ASR system processes phrases in a similar fashion in future ASR operations involving the ASR grammar, and when an utterance has been incorrectly processed, at least one parameter in the ASR grammar is adjusted to decrease a likelihood that the ASR system processes phrases in a similar fashion in future ASR operations involving the ASR grammar.

19. The system of claim 15, wherein the at least one computer is further programmed to implement the identification unit, the information collection unit, and the logic unit.

* * * * *